United States Patent
Kissell et al.

(10) Patent No.: US 7,237,097 B2
(45) Date of Patent: Jun. 26, 2007

(54) PARTIAL BITWISE PERMUTATIONS

(75) Inventors: Kevin D. Kissell, Le Bar sur Loup (FR); Hartvig W. J. Ekner, Holte (DK); Morten Stribaek, Frederiksberg (DK); Jakob Schou Jensen, Copenhagen (DK)

(73) Assignee: MIPS Technologies, Inc., Mountain View, CA (US)

( * ) Notice: Subject to any disclaimer, the term of this patent is extended or adjusted under 35 U.S.C. 154(b) by 530 days.

(21) Appl. No.: 09/788,683

(22) Filed: Feb. 21, 2001

(65) Prior Publication Data
US 2002/0116602 A1 Aug. 22, 2002

(51) Int. Cl.
G06F 9/305 (2006.01)

(52) U.S. Cl. ...................................... 712/223; 712/300
(58) Field of Classification Search ................ 712/223, 712/224, 300; 708/168, 230
See application file for complete search history.

(56) References Cited

U.S. PATENT DOCUMENTS

| | | | |
|---|---|---|---|
| 4,085,447 A * | 4/1978 | Pertl et al. .................. | 712/224 |
| 4,569,016 A * | 2/1986 | Hao et al. ................... | 712/224 |
| 4,928,223 A | 5/1990 | Dao et al. | |
| 4,949,250 A | 8/1990 | Bhandarkar et al. | |
| 5,471,628 A * | 11/1995 | Phillips et al. .............. | 712/223 |
| 5,499,299 A | 3/1996 | Takenaka et al. | |
| 5,673,407 A | 9/1997 | Poland et al. | |
| 5,696,937 A | 12/1997 | White et al. | |
| 5,729,554 A | 3/1998 | Weir et al. | |
| 5,748,979 A | 5/1998 | Trimberger | |
| 5,768,172 A | 6/1998 | Derby | |
| 5,781,457 A | 7/1998 | Cohen et al. | |
| 5,819,117 A | 10/1998 | Hansen | |
| 5,838,986 A | 11/1998 | Garg et al. | |
| 6,009,450 A | 12/1999 | Dworkin et al. | |
| 6,035,317 A | 3/2000 | Guy | |
| 6,067,615 A | 5/2000 | Upton | |
| 6,138,229 A | 10/2000 | Kucukcakar et al. | |
| 6,141,421 A | 10/2000 | Takaragi et al. | |
| 6,145,077 A | 11/2000 | Sidwell et al. | |
| 6,154,834 A | 11/2000 | Neal et al. | |
| 6,172,494 B1 | 1/2001 | Feuser | |
| 6,199,087 B1 | 3/2001 | Blake et al. | |
| 6,298,438 B1 * | 10/2001 | Thayer et al. .............. | 712/226 |
| 6,381,690 B1 * | 4/2002 | Lee ............................ | 712/223 |
| 6,430,684 B1 * | 8/2002 | Bosshart .................... | 712/300 |
| 6,615,366 B1 | 9/2003 | Grochowski et al. | |
| 6,618,804 B1 * | 9/2003 | Steele et al. ................ | 712/300 |
| 6,625,737 B1 | 9/2003 | Kissell | |
| 6,715,066 B1 * | 3/2004 | Steele, Jr. .................. | 712/300 |
| 6,952,478 B2 | 10/2005 | Lee et al. | |
| 6,976,178 B1 | 12/2005 | Kissell | |
| 2003/0172254 A1 * | 9/2003 | Mandavilli et al. ......... | 712/224 |

OTHER PUBLICATIONS

Jae Wook Chung et al., *Fast Implementation of Elliptic Curve Defined over $GF(p^m)$ on CalmRISC with MAC2424 Coprocessor*, C.K. Koc and C. Paar (Eds.): CHES 2000, LNCS 1965, pp. 57–70, 2000.

Darrel Hankerson et al., *Software Implementation of Elliptic Curve Cryptography over Binary Fields*, C.K. Koc and C. Paar (Eds.): CHES 2000, LNCS 1965, pp. 1–24, 2000.

(Continued)

*Primary Examiner*—William M. Treat
(74) *Attorney, Agent, or Firm*—Sterne Kessler, Goldstein & Fox PLLC

(57) ABSTRACT

Partial bitwise permutation instructions are provided in a microprocessor or microcontroller. Partial bitwise permutations may be specified by one or more of the following: a destination specifier, a previous partial value source, a destination subset specifier, and a control specifier.

36 Claims, 13 Drawing Sheets

| SPEC2 | rd | rs | rt | ru | PPERM |
|---|---|---|---|---|---|

OTHER PUBLICATIONS

Marc Joye et al., *Efficient Generation of Prime Numbers*, C.K. Koc and C. Paar (Eds.): CHES 2000, LNCS 1965, pp. 340–354, 2000.

Souichi Okada et al., *Implementation of Elliptic Curve Cryptography Coprocessor over GF ($2^m$) on an FPGA*, C.K. Koc and C. Paar (Eds.): CHES 2000, LNCS 1965, pp. 25–40, 2000.

Geraldo Orlando et al., *A High–Performance Reconfigurable Elliptic Curve Processor for GF($2^m$)\**, C.K. Koc and C. Paar (Eds.): CHES 2000, LNCS 1965, pp. 41–56, 2000.

Erkay Savas et al., *A Scalable and Unified Multiplier Architecture for Finite Fields GF(p) and GF($2^m$)\**, C.K. Koc and C. Paar (Eds.): CHES 2000, LNCS 1965, pp. 277–292, 2000.

Zhijie Shie et al., *Bit Permutation Instructions for Accelerating Software Cryptography*, Proceedings of the IEEE International Conference on Application–specific Systems, Architectures and Processors, Jul. 10–12, 2000, Boston Massachusetts, USA, pp. 138–148.

Kutler, Jeffrey, *Smart Cards: Even Abundant Security Features Don't Spur Smart Card Buy–In*, American Banker, vol. 163, No. 221, Nov. 18, 1998, *available in* Am. Banker I 1998 WL 13326041 (9 pages).

*STMicroelectronics And Gemplus Annouce Smart Card Security Certification Including Hardware And Software*, EDP Weekly's IT Monitor, vol. 42, Issue 13, Apr. 2, 2001, *available in* EDP Wkly. 42001 WL 14018034 (3 pages).

*Can Silicon Stop The Smartcard Hackers?*, Electronics Times, Feb. 15, 1999, *available in* Electronics Times 321999 WL 9348105 (3 pages).

*STMicroelectronics and Gemplus Announce Smart Card Security Certification Including Hardware And Software*, Business Wire, Mar. 29, 2001, *available in* WESTLAW, Mar. 29, 2001 Bus. Wire 02:05:00 (3 pages).

Vollmer, Alfred, *Security ICs Are Targetting Consumer Applications*, Electronics Design, vol. 48, Issue 23, Nov. 6, 2000, *available in* Electronics Design 1052000 WL 14003957 (13 pages).

Coron, J.-S. and Goubin L., "On Boolean and Arithmetic Masking Against Differential Power Analysis," in *Proceedings of Second International Workshop on Cryptographic Hardware and Embedded Systems*, CHES 2000 (Eds., ç.K. Koç and C. Paar), Worcester, Massachusetts, USA, Aug. 17–18, 2000, pp. 231–237, Springer–Verlag, Berlin/Heidelberg, Germany (2000).

Hasan, M. Anwar, "Power Analysis Attacks and Algorithmic Approaches to their Countermeasures for Koblitz Curve Cryptosystems," in *Proceedings of Second International Workshop on Cryptographic Hardware and Embedded Systems*, CHES 2000 (Eds., ç.K. Koç and C. Paar), Worcester, Massachusetts, USA, Aug. 17–18, 2000, pp. 93–108, Springer–Verlag, Berlin/Heidelberg, Germany (2000).

Kato, T. et al., "A Design for Modular Exponentiation Coprocessor in Mobile Telecommunication Terminals," in *Proceedings of Second International Workshop on Cryptographic Hardware and Embedded Systems*, CHES 2000 (Eds., ç.K. Koç and C. Paar), Worcester, Massachusetts, USA, Aug. 17–18, 2000, pp. 216–228, Springer–Verlag, Berlin/Heidelberg, Germany (2000).

Mayer–Sommer, R., "Smartly Analyzing the Simplicity and the Power of Simple Power Analysis on Smartcards," in *Proceedings of Second International Workshop on Cryptographic Hardware and Embedded Systems*, CHES 2000 (Eds., ç.K. Koç and C. Paar), Worcester, Massachusetts, USA, Aug. 17–18, 2000, pp. 78–92, Springer–Verlag, Berlin/Heidelberg, Germany (2000).

Naccache, D. and Tunstall, M., "How to Explain Side–Channel Leakage to Your Kids," in *Proceedings of Second International Workshop on Cryptographic Hardware and Embedded Systems*, CHES 2000 (Eds., ç.K. Koç and C. Paar), Worcester, Massahusetts, USA, Aug. 17–18, 2000, pp. 229–230, Springer–Verlag, Berlin/Heidelberg, Germany (2000).

Shamir, A., "Protecting Smart Cards from Passive Power Analysis with Detached Power Supplies," in *Proceedings of Second International Workshop on Cryptographic Hardware and Embedded Systems*, CHES 2000 (Eds., ç.K. Koç and C. Paar), Worcester, Massachusettes, USA, Aug. 17–18, 2000, pp. 71–77, Springer–Verlag, Berlin/Heidelberg, Germany (2000).

Weingart, S.H., "Physical Security Devices for Computer Subsystems: A Survey of Attacks and Defenses," in *Proceedings of Second International Workshop on Cryptographic Hardware and Embedded Systems*, CHES 2000 (Eds., ç.K. Koç and C. Paar), Worcester, Massachusetts, USA, Aug. 17–18, 2000, pp. 302–317, Springer–Verlag, Berlin/Heidelberg, Germany (2000).

Kocher, P. et al., "Differential Power Analysis," in *Advances in Cryptology –Proceedings of 19th Annual International Cryptology Conference, CRYPTO '99* (Ed. Michael J. Wiener), Santa Barbara, California, USA, Aug. 15–19, 1999, Springer–Verlag, Berlin/Heidelberg, Germany (1999) 10 pages.

Daemen, J. et al., "Bitslice Ciphers and Power Analysis Attacks," presented at *Fast Software Encryption Workshop 2000*, New York, New York, USA, Apr. 10–12, 2000 (16 pages).

Clavier, C. et al., "Differential Power Analysis in the Presence of Hardware Countermeasures," in *Proceedings of Second International Workshop on Cryptographic Hardware and Embedded Systems, CHES 2000* ) Eds., ç.K. Koç and C. Paar), Worcester, Massachusetts, USA, Aug. 17–18, 2000, pp. 252–263, Springer–Verlag, Berlin/Heidelberg, Germany (2000).

Shi, Z., and Lee, R.B., "Bit Permutation Instructions for Accelerating Software Cryptography," *Proceedings of the IEE International Conference on Application–specific Systems, Architectures and Processors*, pp. 138–148, Boston, MA (Jul. 10–12, 2000).

Marketing literature from Philips Semiconductors, "On the Move–13 Philips Semiconductors and IBM Research to Co–develop Secure Smart Cards" [online]. Feb. 1999, Document order number 9397.750.05157, [Retrieved on Feb. 1, 2006]. Retrieved from the Internet: <URL: http://www.semiconductors.philips.com/acrobat_download/literature/9397/75005157.pdf>.

Philips Semiconductors Short From Specification, "P16WX064 SmartXA–Family, Secure 16–bit Smart Card Controller," Revision 1.1 [online]. Feb. 2001, pp. 1–11 [Retrieved on Feb. 1, 2006]. Retrieved from the Internet: <URL: http://www.semiconductors.philips.com/acrobat_download/other/identification/sfs052411.pdf>.

Certification Report BSI–DSZ–CC–0203–2003 for Philips Smart Card Controller P16WX064V0C [online]. Philips Semiconductors GmbH [Retrieved on Feb. 1, 2006]. Retrieved from the Internet: <URL: http://www.bsi.bund.de//zertifiz/reporte/0203a.pdf>.

"Security Target BSI–DSZ–CC–0203, Version 1.1, Jan. 24$^{th}$, 2003, Evaluation of the Philips P16WX064V0C Secure 16–bit Smart Card Controller" [online]. Philips Semiconductor GmbH, pp. 1–74 [Retrieved on Feb. 1, 2006]. Retrieved from the internet<URL: http://www.commoncriteriaportal.org/public/files/epfiles/0203b.pdf>.

Jean–Francois Dhem and Nathalie Feyt, "Hardware and Software Symbiosis Helps Smart Card Evolution" [online]. IEEE Micro, Nov.–Dec. 2001, pp. 14–25 [Retrieved on Feb. 1, 2006]. Retrieved from the Internet:<URL: http://www.it.iitb.ac.in/~satish/Thesis%20Report%20New%201/2_Review%20of%20literture/2_reference/2_29_Hardware%20and%20software%20symbiosis%20helps%20smart%20 card%20evolution.pdf>.

Jean–Francois Dhem and Nathalie Feyt, "Present and Future Smart Cards" [online]. Gemplus—Card Securtity Group, pp. 1–9 [Retrieved on Feb. 1, 2006]. Retrieved from the Internet:<URL: http://www.it–c.dk/courses/DSK/F2003/smart2.pdf>.

Patent Abstracts of Japan, Publication No. JP11203106 (Jul. 30, 1999), English Language Abstract for JP Patent Application No. JP19980005096 (Jan. 13, 1998).

Patent Abstracts of Japan, Publication No. JP4142618 (May 15, 1992), English Language Abstract for JP Pantent Application No. JP19900264991 (Oct. 4, 1990).

Patent Abstract of Japan, Publication No. JP61223938 (Oct. 4, 1986), English Language Abstract for JP Patent Applicaiton No. JP19850063782 (Mar. 29, 1985).

Patent Abstracts of Japan, Publication No. JP8314717 (Nov. 29, 1996), English Language Abstract for JP Patent Application No. JP19960146619 (May 16, 1996).

Patent Abstracts of Japan, Publication No. JP2003533829T (Nov. 11, 2003), English Language Abstract for JP Patent Application No. JP20010585439T (May 7, 2001).

\* cited by examiner

| SPEC2 | rd | rs | rt | ru | PPERM |
|---|---|---|---|---|---|

*FIG. 10A*

| 3 bits | 3 bits | 1 bit | 5 bits | 5 bits | 5 bits | 5 bits | 5 bits | 5 bits |
|---|---|---|---|---|---|---|---|---|
| unused | dest nibble | default bit | mask | src bit 3 | src bit 2 | src bit 1 | src bit 0 | |

*FIG. 10B*

| SPEC2 | rd | rs | src bit 1 | src bit 0 | PPERM2 |
|---|---|---|---|---|---|

FIG. 11A

| SPEC2 | rd | rs | null | src bit 0 | PPERM1 |
|---|---|---|---|---|---|

FIG. 11B

| SPEC2 | 0 | rs | rt | 0 | dest. "quibble" | PPERM |

*FIG. 12A*

| 1 bit | 1 bit | 5 bits | 5 bits | 5 bits | 5 bits | 5 bits | 5 bits | 5 bits |
|---|---|---|---|---|---|---|---|---|
| unused | default bit | mask | src bit 4 | src bit 3 | src bit 2 | src bit 1 | src bit 0 |

| 31 | 26 25 | 21 20 | 16 15 | 11 10 | 6 5 | 0 |
|---|---|---|---|---|---|---|
| SPEC2 011100 | rs | rt | 0 | PPERM 10010 | MADDU/CRYPTO 000001 |
| 6 | 5 | 5 | 5 | 5 | 6 |

FIG. 13B

| 31 30 29 | 25 24 | 20 19 | 15 14 | 10 9 | 5 4 | 0 |
|---|---|---|---|---|---|---|
| 0 | Source of bit 5 | Source of bit 4 | Source of bit 3 | Source of bit 2 | Source of bit 1 | Source of bit 0 |
| 2 | 5 | 5 | 5 | 5 | 5 | 5 |

PARTIAL BITWISE PERMUTATIONS

CROSS-REFERENCE TO RELATED APPLICATIONS

This application is related to the following co-pending applications, each of which is being filed concurrently with this application and is incorporated by reference: (1) U.S. application Ser. No. 09/788,682, titled "Configurable Instruction Sequence Generation"; (2) U.S. application Ser. No. 09/788/670, titled "Binary Polynomial Multiplier"; (3) U.S. application Ser. No. 09/788,684, titled "Polynomial Arithmetic Operations"; and (4) U.S. application Ser. No. 09/788,685, titled "Extended Precision Accumulator".

TECHNICAL FIELD

This invention relates to a technique for performing partial bitwise permutations in a microprocessor.

BACKGROUND

Reduced instruction set computer (RISC) architectures were developed as industry trends tended towards larger, more complex instruction sets. By simplifying instruction set designs, RISC architectures make it easier to use techniques such as pipelining and caching, thus increasing system performance.

RISC architectures usually have fixed-length instructions (e.g., 16-bit, 32-bit, or 64-bit), with few variations in instruction format. Each instruction in an instruction set architecture (ISA) may have the source registers always in the same location. For example, a 32-bit ISA may always have source registers specified by bits 16–20 and 21–25. This allows the specified registers to be fetched for every instruction without requiring any complex instruction decoding.

SUMMARY

Cryptographic systems ("cryptosystems") are increasingly used to secure transactions, to encrypt communications, to authenticate users, and to protect information. Many secret-key cryptosystems, such as the Digital Encryption Standard (DES), are relatively simple computationally and frequently reducible to hardware solutions performing sequences of XORs, rotations, and permutations on blocks of data.

In one general aspect, an instruction for performing partial bitwise permutations is provided in an instruction set architecture. The instruction includes an opcode identifying the instruction as a partial permutation instruction, and a permutation operation specification. The permutation operation specification includes a destination specifier identifying a destination register, a previous partial value source specifier, a destination subset specifier, and a control specifier. The destination subset specifier identifies one or more destination bits of the destination register, and the control specifier identifies a source for each of the identified destination bits. The instruction is processed by performing a partial bitwise permutation defined by the permutation operation specification.

Implementations may include a destination specifier that either implicitly or explicitly identifies the destination register. The destination register may be specified as an accumulator within a multiply/divide unit of a microprocessor and/or a general-purpose register. Likewise, the partial value source specifier may implicitly or explicitly identify a previous partial value source register. The previous partial value source register may be specified as an accumulator and/or a general-purpose register. Additionally, the destination register and the previous partial value source register may be identified as the same register.

In some implementations, the destination subset specifier identifies a contiguous block of bits within the destination register. The contiguous block of bits may include the least significant bit of the destination register. Various implementations may include 1–6 or more bits within the contiguous block of bits.

The control subset specifier may include one or more source bit identifiers, and may include a mask and a default bit. Additionally, the control subset specifier may be stored as a field within an instruction or may be stored in a general-purpose register.

Implementations may include providing a partial permutation instruction within a RISC instruction set.

The details of one or more implementations are set forth in the accompanying drawings and the description below. Other features and advantages will be apparent from the description and drawings, and from the claims.

DESCRIPTION OF DRAWINGS

FIG. 10A is an instruction encoding of an exemplary partial permutation instruction having four operands.

FIG. 10B is an exemplary control word encoding format for use as an operand to a partial permutation instruction such as shown in FIG. 10A.

FIGS. 11A and 11B are instruction encodings of exemplary partial permutation instructions not using a control word operand.

FIG. 12A is an instruction encoding of an exemplary partial permutation instruction that implicitly uses registers of a multiply/divide unit.

FIG. 12B is an exemplary control word encoding format for use as an operand to a partial permutation instruction such as shown in FIG. 12A.

FIG. 13A is an instruction encoding of another partial permutation instruction that implicitly uses registers of a multiply/divide unit.

FIG. 13B is an exemplary control word encoding format for use as an operand to a partial permutation instruction such as shown in FIG. 13A.

DETAILED DESCRIPTION

Some cryptographic operations, such as the Digital Encryption Standard (DES) (as well as several of the candidates for the Advanced Encryption Standard (AES) to replace DES), perform some degree of bitwise permutation of data values. These operations, which map poorly to conventional microprocessor instruction set architectures, often may be implemented efficiently in hardware. However, the National Institute of Standards and Technology is in the process of creating the new AES standard. Therefore, it is uncertain which algorithms will be used in the future. For at least this reason, it is desirable to provide a microprocessor with support for bitwise permutations that may be used to increase the performance of cryptographic algorithms such as block ciphers.

Figure 1:
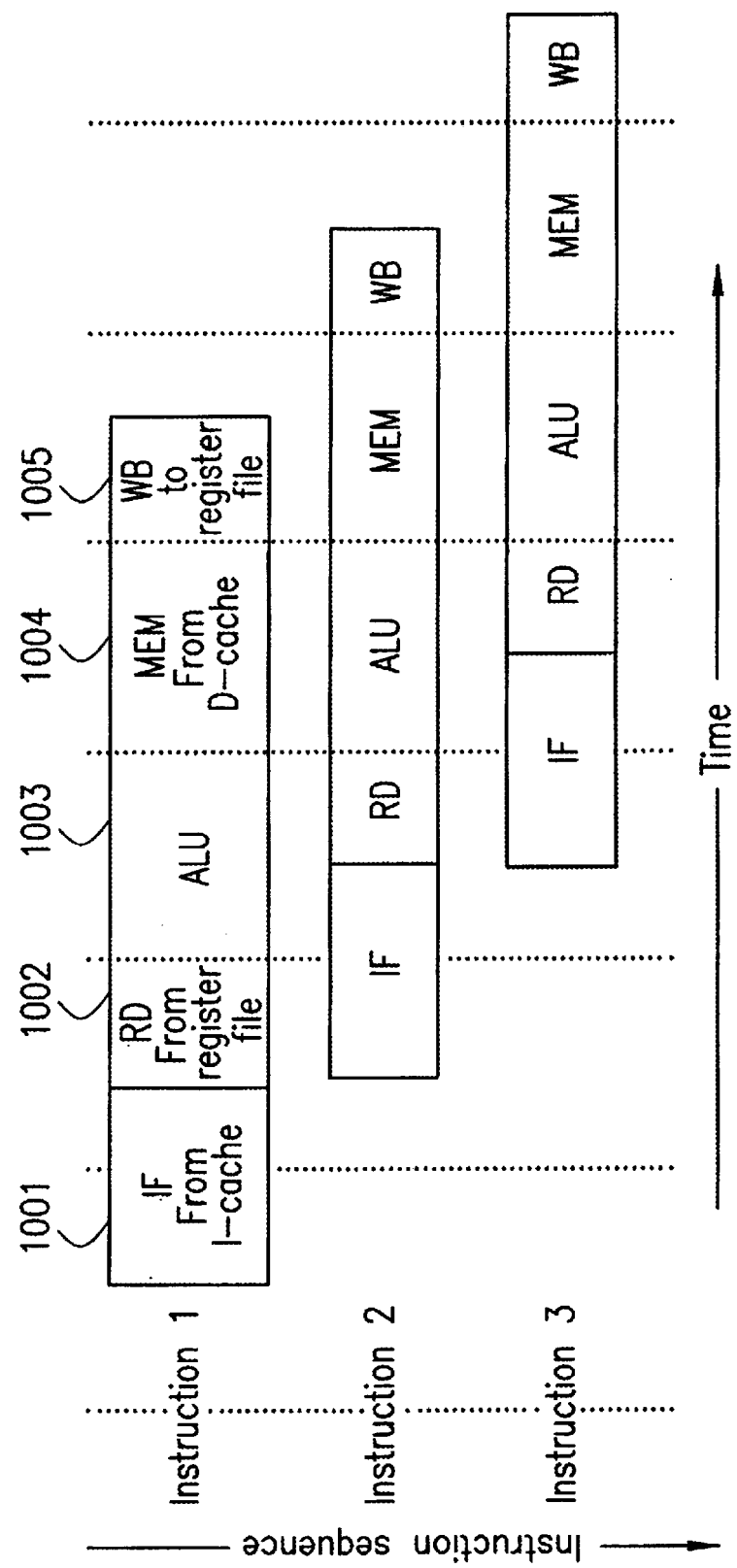
FIG. 1 is a block diagram of an exemplary five-stage pipeline that may be used in a RISC architecture.

Referring to FIG. 1, an exemplary microprocessor architecture that may be used to implement polynomial multiplication includes a five-stage pipeline in which each instruction is executed in a fixed amount of time, such as, for example, four clock cycles. The execution of each instruction is divided into five stages: instruction fetch (IF) stage 1001, register read (RD) stage 1002, arithmetic/logic unit (ALU) stage 1003, memory (MEM) stage 1004, and write back (WB) stage 1005. In the IF stage 1001, a specified instruction is fetched from an instruction cache. A portion of the fetched instruction is used to specify source registers that may be used in executing the instruction. In the read registers (RD) stage 1002, the system fetches the contents of the specified source registers. These fetched values may be used to perform arithmetic or logical operations in the ALU stage 1003. In the MEM stage 1004, an executing instruction may read/write memory in a data cache. Finally, in the WB stage 1005, values obtained by the execution of the instruction may be written back to a register.

Because some operations, such as floating point calculations and integer multiply/divide, cannot be performed in a single clock cycle, some instructions merely begin execution of an instruction. After sufficient clock cycles have passed, another instruction may be used to retrieve a result. For example, when an integer multiply instruction takes five clock cycles, one instruction may initiate the multiplication calculation, and another instruction may load the results of the multiplication into a register after the multiplication has completed. If a multiplication has not completed by the time a result is requested, the pipeline may stall until the result is available.

Figure 2:
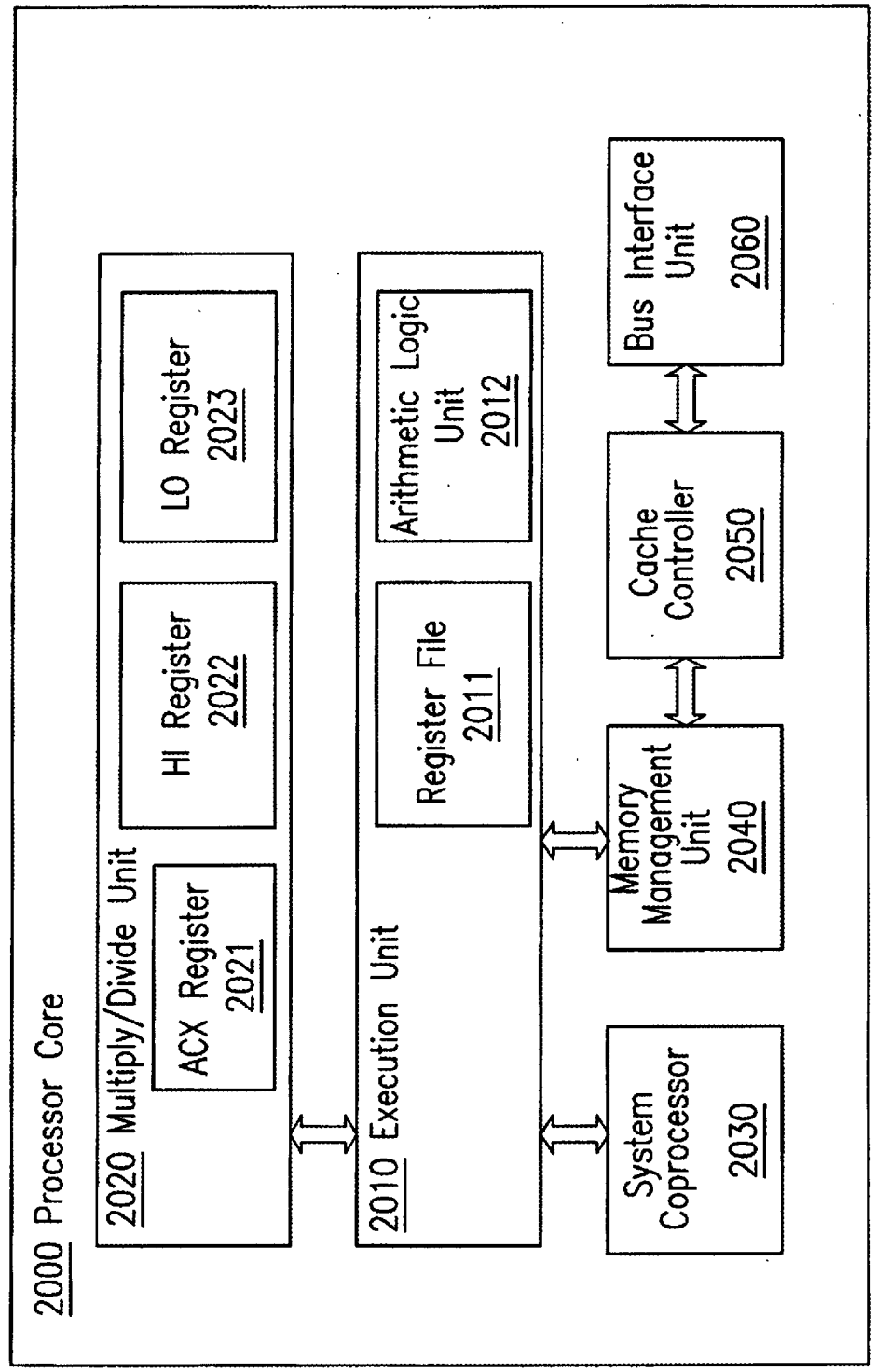
FIG. 2 is a block diagram of a processor core including an execution unit and a multiply/divide unit.

Referring to FIG. 2, an exemplary RISC architecture is provided by way of example. The processor core 2000 (also referred to as a "microprocessor core") includes the following: an execution unit 2010, a multiply/divide unit (MDU) 2020, a system control coprocessor (CP0) 2030, a memory management unit 2040, a cache controller 2050, and a bus interface unit (BIU) 2060. In FIG. 2, MDU 2020 is a combined multiply/divide unit; however, other implementations provide separate multiply and divide units.

Execution unit 2010 is the primary mechanism for executing instructions within processor core 2000. Execution unit 2010 includes a register file 2011 and an arithmetic logic unit (ALU) 2012. In one implementation, the register file 2011 includes 32 32-bit general-purpose registers that may be used, for example, in scalar integer operations and address calculations. The register file 2011 includes two read ports and one write port and may be fully bypassed to minimize operation latency in the pipeline. ALU 2012 supports both logical and arithmetic operations, such as addition, subtraction, and shifting.

The MDU 2020 includes three registers (ACX 2021, HI 2022, and LO 2023) that may be used for various operations. In accordance with one implementation, these three registers may be used together to hold up to a 72-bit value. In one implementation, LO register 2023 and HI register 2022 are each 32 bits wide and function as dedicated output registers of MDU 2020. In one implementation, ACX register 2021 provides 8 bits of additional integer precision beyond those provided by the HI/LO register pair. The precise number of bits is implementation dependent, with the preferred minimum size being 2 bits. For processors with 32 bit data paths, the preferred maximum size of the ACX register is 32 bits. In contrast, for processors with 64 bit data paths, the preferred maximum size of the ACX register is 64 bits. Hence, in a processor with 32-bit wide HI and LO registers, the combination of ACX/HI/LO can hold a 64-or-more-bit concatenated value. MDU 2020 may be used to perform various operations including some or all of the following instructions: DIV, DIVU, MADD, MADDU, MFHI, MFLO, MSUB, MSUBU, MTHI, MTLO, MUL, MULT, MULTU, MFLHXU, MTLHX, MADDP, MULTP, and PPERM.

The instructions MUL, MULT, and MULTU may be used to multiply two 32-bit numbers together. The result is stored in a specified register for MUL, and in the HI/LO registers for MULT and MULTU. For example, "MUL $7, $6, $5" multiplies the contents of registers $6 and $5 together and stores the result in register $7. The instruction "MULT $6, $5" multiplies the contents of registers $6 and $5 together and stores the result in the HI/LO registers. The MULTU instruction performs the same operation as MULT with MULTU applying to unsigned operands and MULT applying to signed operands. Additionally, the MULTU instruction clears the ACX register to all zeros.

The instructions DIV and DIVU perform division operations and store the results in the ACX/HI/LO registers. For example, "DIV $6, $5" divides the contents of register $6 by the contents of register $5 and stores the resulting remainder and quotient in the HI/LO registers. The DIVU instruction performs the same operation on unsigned operands.

The instructions MSUB, MSUBU, MADD, and MADDU may be used to multiply the contents of two registers and then add or subtract the resulting product with the contents of the ACX/HI/LO registers. For example, "MSUB $6, $5" multiplies the contents of registers $6 and $5 together, subtracts the result of the multiplication from the contents of the ACX/HI/LO registers, and then stores the resulting value in the ACX/HI/LO registers. The MADD instruction similarly multiplies the contents of two registers, adds the result to the ACX/HI/LO registers, and stores the result in the ACX/HI/LO registers. The MSUBU and MADDU perform the analogous operations to unsigned operands. In some implementations, the ACX register is not used for some operations and the contents of the ACX register following such operations may be undefined.

The MFHI, MFLO, MTHI, MTLO, MFLHXU, and MTLHX are used to move data between the ACX/HI/LO registers and general purpose registers. The first instruction, MFHI, loads the contents of the HI register into a general purpose register. For example, "MFHI $5" loads the contents of the HI register into register $5. Similarly, MFLO loads the contents of the LO register into a general purpose register. Conversely, the instructions MTHI and MTLO are used to load the contents of a general purpose register into the HI or LO registers. For example, "MTHI $5" loads the contents of register $5 into the HI register.

In one implementation, the content of the ACX register is not directly accessible. To indirectly access the ACX register, the values stored in the ACX/HI/LO registers may be shifted to the left or right. For example, "MFLHXU $5" shifts contents of the ACX, HI, and LO registers to the right by one register position, loading the contents of the LO register into register $5. Thus, after performing the operation, the ACX register is zero, the HI register contains the previous contents of the ACX register, the LO register contains the previous contents of the HI register, and register $5 contains the previous contents of the LO register. Because the contents of the 8-bit ACX register are loaded into a 32-bit register, the 8-bit value may be zero-extended to 32-bits before loading the HI register.

The MTLHX performs the inverse operation. For example, "MTLHX $5" loads the ACX register with the previous contents of the HI register, loads the HI register with the previous contents of the LO register, and loads the LO register with the contents of register $5.

The PPERM operation performs permutations as specified in a register, storing the result in the ACX/HI/LO registers. For example, "PPERM $5, $6" causes the ACX/HI/LO registers to be shifted 6-bits to the left. Then, low-order six bits are selected from register $5 as specified by register $6. In particular, the 32-bit contents of register $6 are used to select which bits of register $5 will be used to fill the low-order bits of the ACX/HI/LO registers. Since there are 32 bits in register $5, 5 bits are needed to specify a specific one of the 32 bits. For example, "01101" is binary for the number 13. Thus, these five bits may specify bit 13. Similarly, "00000" is binary for 0 and "11111" is binary for 31. Thus, any one of the 32 bits may be specified using a 5-bit specifier, and 6 bits may be specified using 30 bits (i.e., 6 5-bit specifiers).

Register $6 may specify the bits of register $5 used to fill the low-order bits of ACX/HI/LO as follows: bits 0–4 are used to specify the source of bit 0, bits 5–9 are used to specify bit 1, bits 10–14 are used to specify bit 2, bits 15–19 are used to specify bit 3, bits 20–24 are used to specify bit 4, and bits 25–29 are used to specify bit 5. The remaining bits, 30–31, may be unused. Thus, the instruction is performed using the specifiers as described to fill the lowest 6 bits of the LO register with the specified bits from the register $5.

Finally, MULTP may be used to perform binary polynomial multiplication and MADDP may be used to perform binary polynomial multiplication with the result added to the ACX/HI/LO registers. These operations are analogous to MULT and MADD, but operate on binary polynomial operands.

The polynomial operands of MULTP and MADDP are encoded in 32-bit registers with each bit representing a polynomial coefficient. For example, the polynomial "$x^4+x+1$" would be encoded as "10011" because the coefficients of $x^3$ and $x^2$ are "0" and the remaining coefficients are "1". The MULTP instruction performs binary polynomial multiplication on two operands. For example, $$(x^4+x+1)(x+1)=x^5+x^4+x^2+2x+1.$$

Reducing the polynomial modulo two, yields $x^5+x^4+x^2+1$. If the polynomials are encoded in the binary representation above, the same multiplication may be expressed as (10011)(11)=110101.

The MADDP instruction performs multiplication just as MULTP, and then adds the result to the ACX/HI/LO registers. Polynomial addition may be performed using a bitwise XOR. For example, the binary polynomial addition $(x^4+x+1)+(x+1)$ yields $x^4+2x+2$. Reducing the coefficients modulo 2 yields $x^4$, which may be expressed as "10000".

Figure 3:
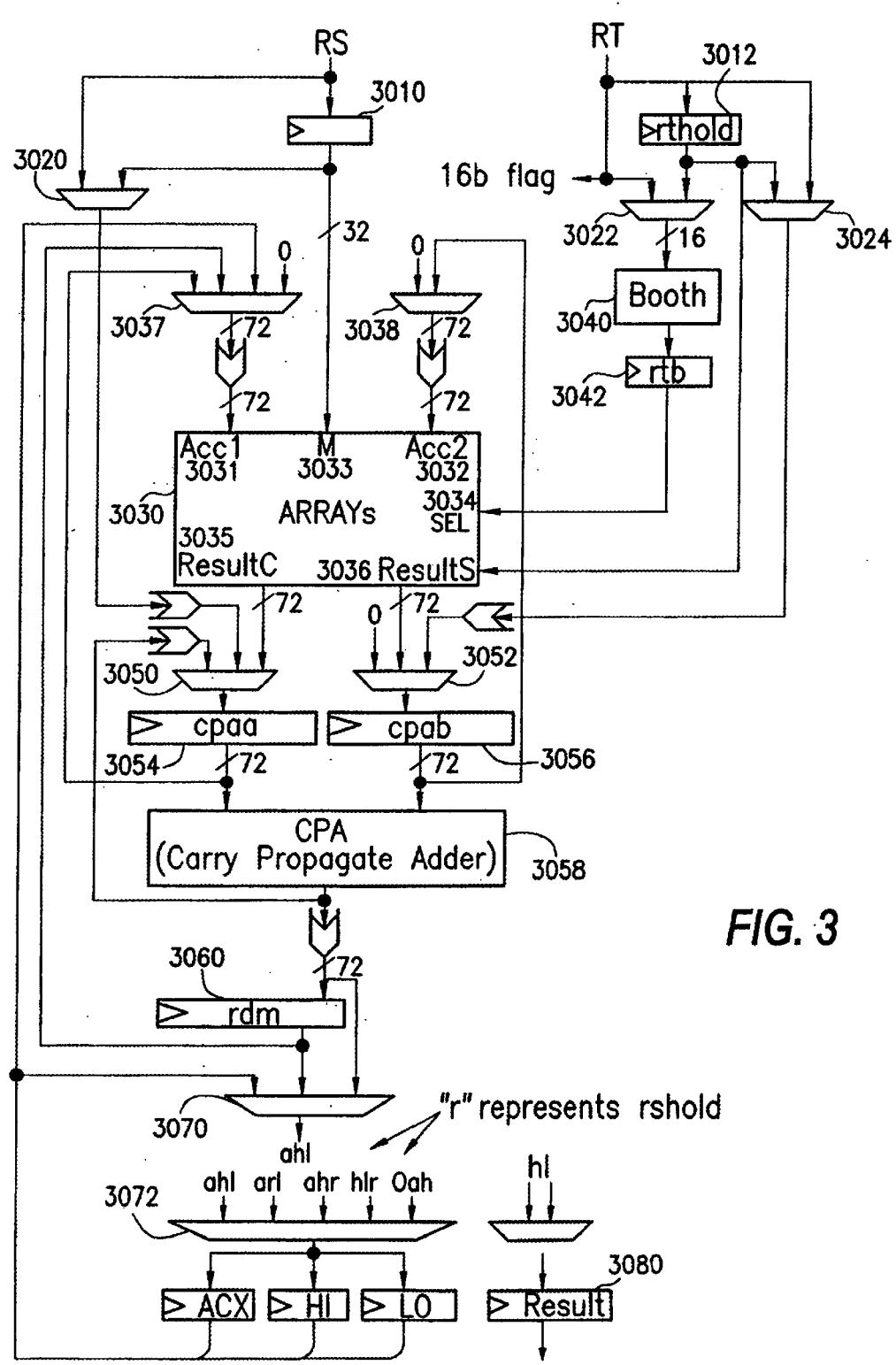
FIG. 3 is a diagram of data paths in an implementation of a multiply/divide unit supporting binary polynomial arithmetic.

Referring to FIG. 3, MDU 2020 receives two 32-bit operands, RS and RT. Using these operands, MDU 2020 performs a requested operation and stores a result in registers ACX 2021, HI 2022, and LO 2023. Major data paths that may be used to perform these operations are shown in FIG. 3. The RShold register 3010 and the RThold register 3012 are used to hold the RS and RT operands. Multiplexers 3020, 3022, and 3024 are used to select whether to use the RS and RT operands directly or to use the values stored in the RShold register 3010 and the RThold register 3012. Additionally, multiplexer 3022 may be used to select between the low-order and high-order bits of RT or the value stored in the RThold register 3012.

The RThold register 3012 is connected to multiplexer 3022. Multiplexer 3022 produces a 16-bit result by selecting the high-order bits of RThold 3012, the low-order bits of RThold 3012, the high-order bits of the RT operand, or the low-order bits of the RT operand. The output from multiplexer 3022 is processed by Booth recoder 3040 and stored in register RTB 3042. Booth recoding is a technique that permits the multiplier array to treat signed and unsigned operands the same. The output of register RTB 3042 becomes the input SEL 3034 to array unit 3030.

Array unit 3030 is used to perform arithmetic and binary polynomial multiplication as described below with reference to FIG. 4. Array unit 3030 takes as inputs ACC1 3031, ACC2 3032, M 3033, SEL 3034, and RThold 3012. Inputs ACC1 3031 and ACC2 3032 are accumulated results used for operations that perform a multiplication and add or subtract the resulting value from an accumulated result. The inputs SEL 3034 (determined by register RTB 3042) and M 3033 (determined by register RShold 3010) form the operands for arithmetic operations. The inputs RThold 3012 (or the high-order or low-order bits of RThold 3012) and M 3033 (determined by RShold 3010) form operands for polynomial operations and permutations. Combinations of these inputs are used to perform various calculations as described in detail below.

Array unit 3030 also includes two outputs, ResultC 3035 and ResultS 3036. In performing arithmetic operations, carry-save adders (CSAs) may be used to build a multiplication array. Carry-save adders calculate sums and carries separately to produce two outputs. Thus, ResultC 3035 and ResultS 3036 represent, respectively, the carry and the sum outputs of a CSA multiplier array. In one implementation, ACC1 3031, ACC2 3032, ResultC 3035, and ResultS 3036 are each 72 bits long and the remaining inputs are at most 32 bits long. Inputs ACC1 3031 and ACC2 3032 may be selected using multiplexers 3037 and 3038.

Multiplexers 3050 and 3052 are used to select values as inputs to registers CPAA 3054 and CPAB 3056. For example, multiplexer 3050 may be used to select between ResultC 3035, the output of CPA 3058, or the output of multiplexer 3020 (i.e., operand RS or the output of RShold 3010). Similarly, multiplexer 3052 may be used to select between ResultS 3036, the value 0, and the output of multiplexer 3024 (i.e., operand RT or the output of RThold 3012). Registers CPAA 3054 and CPAB 3056 store the inputs to carry propagate adder (CPA) 3058. CPA 3058 may be used to complete multiplication operations (multiplies) and to perform iterative division operations (divides) as discussed below.

Register RDM 3060 stores the result of CPA 3058. Finally, multiplexers 3070 and 3072 select which values form the result to be loaded into registers ACX, HI, and LO. Multiplexer 3070 may be used to select the ACX/HI/LO registers, RDM 3060, or the result of CPA 3058. Multiplexer 3072 may be used to instead load various permutations of the result selected by multipexer 3070. Multiplexer 3072 is used to perform various rotations and loads of the ACX/HI/LO registers by permitting selection of the following values (forming 72-bit values when concatenated): (1) ahl, the 72-bit output of multiplexer 3070; (2) arl, the 8 high-order bits of multiplexer 3070, the contents of RShold 3010, and the 32 low-order bits of multiplexer 3070; (3) ahr, the 40 high-order bits of multiplexer 3070 and the contents of RShold 3010; (4) hlr, the 40 low-order bits of multiplexer 3070 and the contents of RShold 3010; and (5) 0ah, the 40 high-order bits of multiplexer 3070 (with 32 leading zeros).

Some operations cause the values stored in the result registers ACX, HI, and LO to be overwritten. For this reason, a separate result register 3080 may be provided to store the high-order and low-order result without the accumulator ACX.

The data path described below includes six major parts: (1) input registering and selection; (2) Booth recoding; (3) multiplier arrays and permutation logic; (4) a carry propagate adder; (5) result registering and selection; and (6) a separate 32-bit output register for presenting results.

Input registering and selection is performed using the RShold and RThold registers to hold the RS and RT operands. Multiplexers select whether to use these operands directly or to use the registered versions. Booth recoding is performed on half of the RT operand at a time to provide inputs to the multiplier arrays and permutation logic.

Booth recoding is a technique that permits the multiplier array to treat signed and unsigned operands the same. This technique "recodes" operands as a subtraction from the next highest power of two. For example, 7 may be Booth recoded as follows: $8-1=1000_2-0001_2=100\overline{1}$, wherein $\overline{1}$ represents $-1$. Hennessy and Patterson describe Booth recoding in Appendix A of "Computer Architecture: A Quantitative Approach," which is incorporated by reference in its entirety for all purposes.

One array of array unit 3030 performs arithmetic multiplication and one array of array unit 3030 performs binary polynomial multiplication. In one implementation, both arrays are 32 bits by 16 bits (32×16) and are used once or twice depending on the size of the RT operand (i.e., an appropriate array is used once when RT is 16 bits long and twice when RT is 32 bits long). The CPA may be used to complete multiplies and to perform iterative divides. Other implementations may include faster mechanisms for performing divides.

The arithmetic multiplication array may be implemented using any of the techniques described by Hennessy and Patterson in the incorporated "Computer Architecture: A Quantitative Approach." For example, Appendix A of Hennessy and Patterson describes several ways to speed up arithmetic multipliers. Any of the described techniques may be used as a basis for the polynomial multiplication extensions described below.

Figure 4:
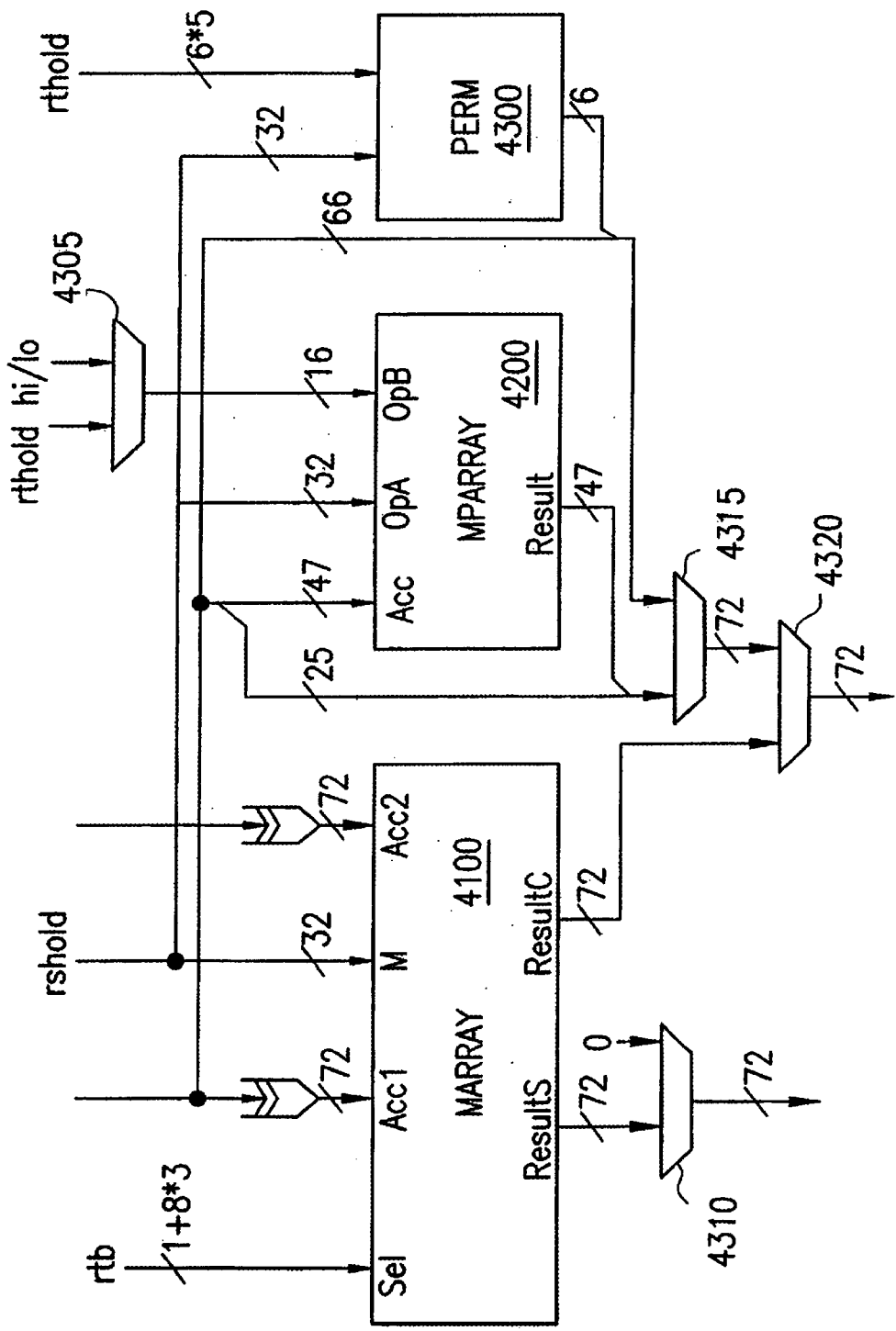
FIG. 4 is a block diagram of multiplier arrays supporting arithmetic and binary polynomial multiplication in one implementation.

Referring to FIG. 4, array unit 3030 includes two parallel multipliers (Marray 4100 and MParray 4200) and permutation logic 4300. The first array, Marray 4100, performs arithmetic multiplication as described below with reference to FIG. 5. Marray 4100 uses ACC1 3031, ACC2 3032, M 3033, and SEL 3034 as inputs and produces a ResultC and a ResultS as outputs. The second array, MParray 4200, performs binary polynomial multiplication as described below with reference to FIG. 6. MParray 4200 uses the low-order bits of RThold 3012 or the high-order bits of RThold 3012 (as selected by a multiplexer 4305), RShold 3010, and ACC1 3031 as inputs, and produces a Result as an output. Finally, permutation logic 4300 is used to perform various permutations on the low-order bits of RShold 3010 based on the value stored in RThold 3012.

A multiplexer 4310 selects between the ResultS output of Marray 4100 and a zero to produce ResultS 3036. Multiplexers 4315 and 4320 select between the ResultC produced by M array 4100, the combination of 25 bits of ACC1 and the 47 bits of the Result produced by MParray 4200, and the results produced by permutation logic 4300 to produce ResultC 3035.

Figure 5:
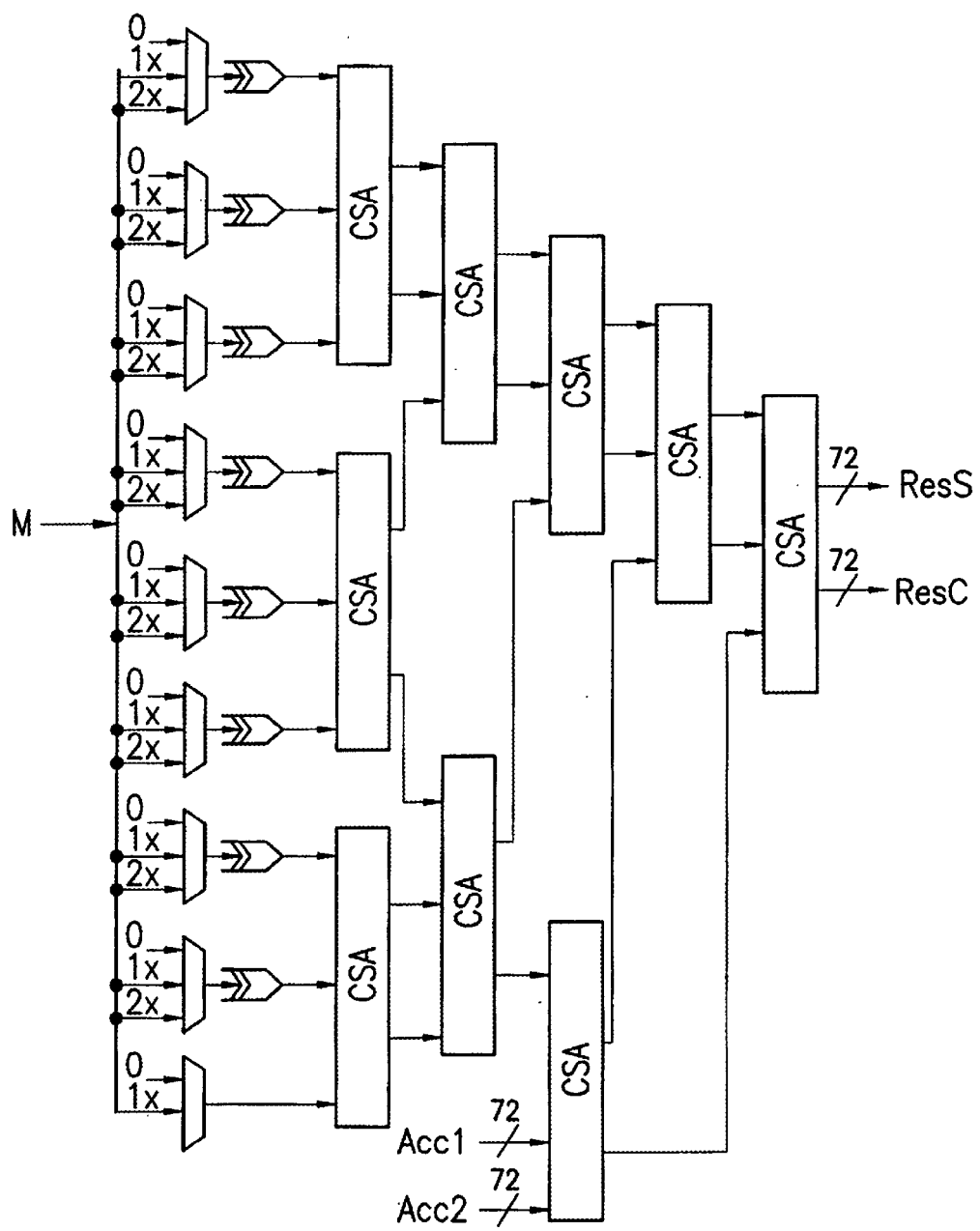
FIG. 5 is a block diagram of an arithmetic multiplier array that may be used in the implementation shown in FIG. 4.

Referring to FIG. 5, Marray 4100 is a 32-bit by 16-bit Wallace tree multiplier array that has been modified to support the addition of two 72-bit wide operands ACC1 and ACC2. The ACC1 and ACC2 operands hold a carry-save representation of a 72-bit value. Because additions are already performed to carry out multiplications (i.e., by the carry-save adders (CSAs)), an additional adder may be included to allow ACC1 and ACC2 to be added to intermediate results of multiplications. Marray 4100 generates a 72-bit wide result in a carry-save representation. Since 32×16 bits are processed per cycle, two passes through the array are required for 32×32 bit multiplies.

Marray 4100 is implemented as a Wallace tree built from arrays of CSAs. The width of these arrays may vary. This design may be implemented using an automated place and route rather than using data path style. Because the accumulate value from the previous array pass is input late into the array, the accumulate value does not need to come directly from a register. Booth recoding is performed using the method of overlapping triplets to more efficiently process multiplications. The output of Booth recoding tells whether to add operand M multiplied by −2, −1, 0, 1, or 2 for each power of 4. The multiplexers on the top-level CSA inputs are used to select the corresponding multiple of M.

Marray 4100 accumulates eight products from the Booth recoding plus one special partial product. The latter may be used for 32-bit unsigned calculations using the "0" and "1×" choices from the multiplexers. Within the Wallace tree, operands may be sign-extended to properly accumulate 2's complement results.

Figure 6:
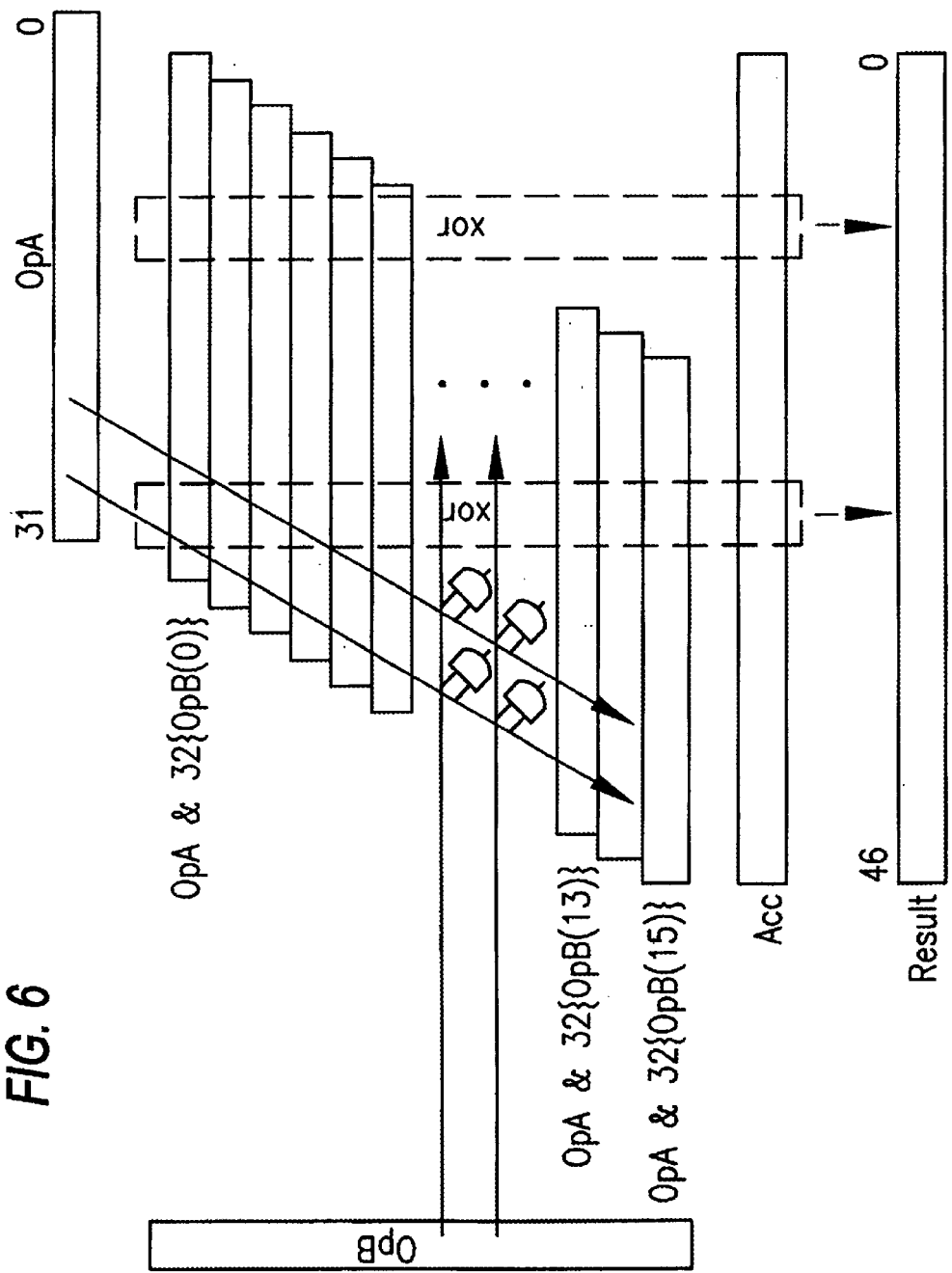
FIG. 6 is a block diagram of a binary polynomial multiplier array that may be used in the implementation shown in FIG. 4.

Referring to FIG. 6, binary polynomial-based multiplication operations are processed similarly to corresponding unsigned arithmetic operations. In one implementation, MParray 4200 is a 32×16 bit array that also performs an addition using exclusive-or (XOR) on an operand, for example, ACC1. As with Marray 4100, 32×16 bits are processed per cycle and two passes through the array may be used for 32×32 multiplies. In the first cycle, ACC1 is zero (for a MULTP operation) or the previous result (for a MADDP operation). In a second cycle, ACC1 is the high order bits of the output from the first cycle.

MParray 4200 multiplies two operands (e.g., OpA and OpB) using an array with each row formed by taking the AND of OpA and a bit of OpB. For example, the first row is the logical AND of OpA and bit 0 of OpB. Row two is the logical AND of OpA and bit 1 of OpB. The result of each successive row is shifted one bit to the left. The final result is formed by taking the exclusive-or (XOR) of each column. Because a bitwise XOR may be used to perform addition in binary polynomial arithmetic, an accumulator row may be added to array MParray 4200 to support instructions such as MADDP.

Referring again to FIG. 1, MDU 2020 starts a computation in the first cycle of the execute stage of the pipeline 1003. If the calculations complete before the instruction has moved past the memory stage 1004 in the pipeline, then the result is held at that point. If the operation completes when the instruction has been moved past the memory stage 1004 in the pipeline, then the instruction has been committed and the results are written directly to the ACX/HI/LO registers.

The MDU 2020 is decoupled from the environment pipeline; it does not stall with the environment. That is to say the MDU 2020 will continue its computation during pipeline stalls. In this way, multi-cycle MDU operations may be partially masked by system stalls and/or other, non-MDU instructions.

Figure 7A:
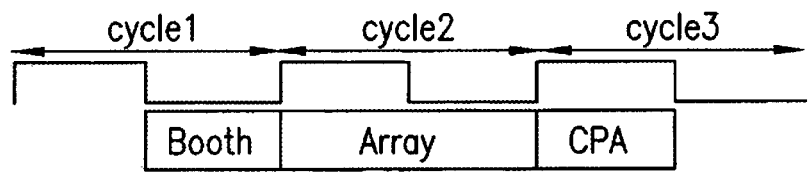
FIG. 7A is a timing diagram showing the operation of 32-bit by 16-bit multiplies in one implementation.

FIG. 7A shows the pipeline flow through MDU 2020 for 32×16 bit multiplies. RS and RT arrive late, so the first cycle may be used for Booth recoding. The second cycle is where the array is run and the third cycle is where the CPA 3058 completes the computation. Because the results are always accessible to reads by MFxx instructions, 32×16 multiplies may be run without stalls. A 32×16 MUL, which returns the result directly to a general purpose register (GPR), may stall for one cycle.

Figure 7B:
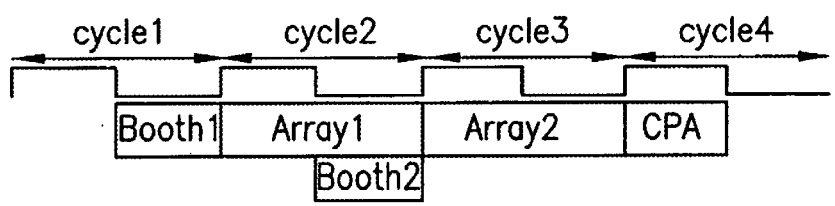
FIG. 7B is a timing diagram showing the operation of 32-bit by 32-bit multiplies in one implementation.

Referring to FIG. 7B, for 32×32 bit multiplies, the array is used twice, which adds one extra clock cycle to the 32×16 bit multiplications. As the first array pass is completing for the first portion of operand RT, Booth recoding is performed on the second portion of the operand. Thus, the Booth recoded portion of RT is available to begin the second pass through the array immediately after the first pass is complete. The multiplication result is then calculated using CPA 3058.

Figure 7C:
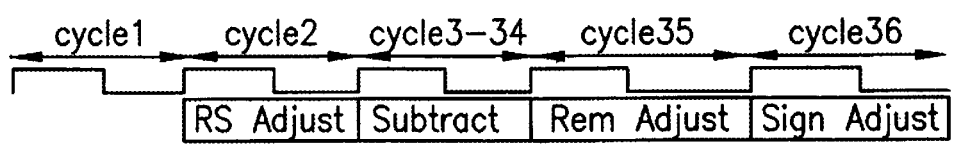
FIG. 7C is a timing diagram showing the operation of divisions in one implementation.

Referring to FIG. 7C, a simple non-restoring division algorithm may be used for positive operands. The first cycle is used to negate RS, if needed. For timing reasons, this cycle is taken even if RS is positive. Following that, 32, 25, 18, or 10 cycles of iterative add/subtract operations are performed. The actual number is based on the amount of leading zeros on the positive RS operand. A final remainder adjust may be needed if the remainder was negative. For timing reasons, this cycle is taken even if the remainder adjust is not needed. Finally, sign adjustment is performed if needed on the quotient and/or the remainder. If both operands are positive, this cycle may be skipped.

In one implementation, target applications demand fast division. Many techniques may be used to increase the performance of division. For example, the Sweeney, Robertson, and Tocher (SRT) algorithm or some variation thereof may be used.

Figure 8:
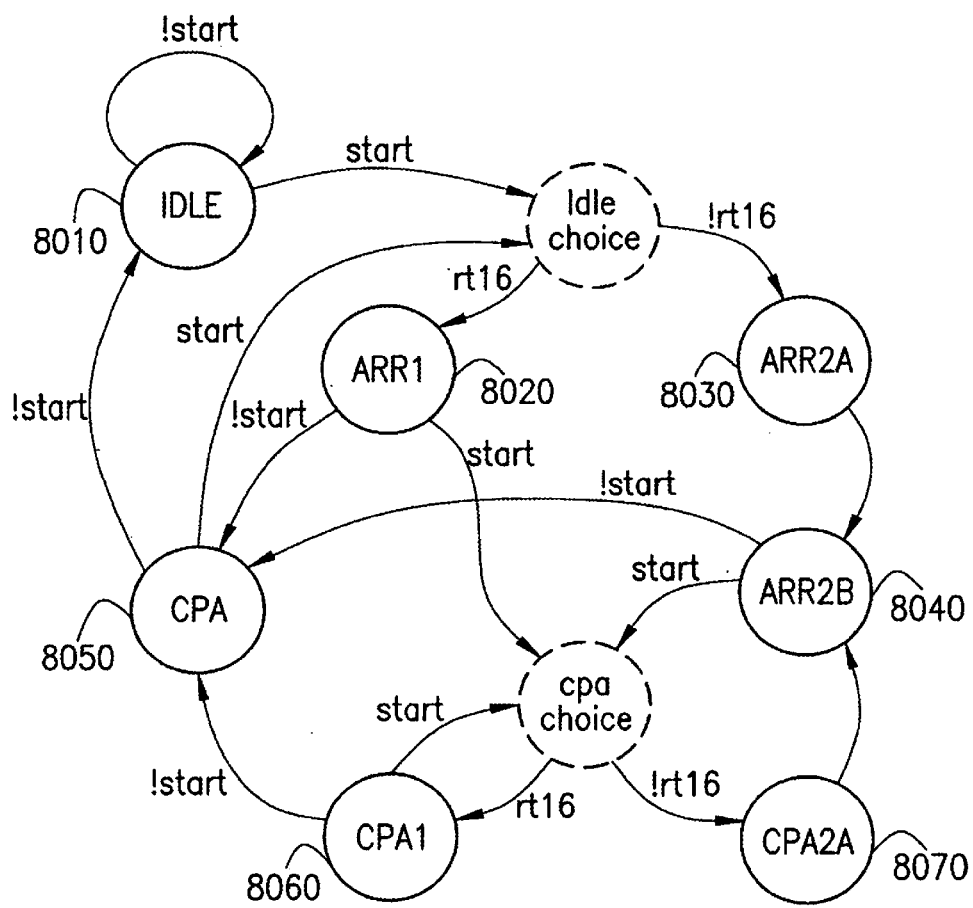
FIG. 8 is a finite state machine implementing steps for performing multiply instructions.

Referring to FIG. 8, multiplication operations are implemented using a finite state machine. Multiplication begins in IDLE state 8010. The multiplier stays in the idle state until the start signal is asserted. Then, the multiplier transitions to either the ARR1 state 8020 or the ARR2A state 8030 depending on whether operand RT contains a 32-bit or 16-bit value. If a 16-bit value is stored in RT, then the system transitions to state ARR2A 8030 where the first array pass is run. The multiplier then transitions to state ARR2B 8040 where the second array pass is run. If a 16-bit value is stored in operand RT, the multiplication is run through the array unit in state ARR1 8020.

In this implementation, the multiplier is pipelined. One multiplication may be run through the array unit and another through the CPA. Thus, the multiplier either transitions from ARR1 8020 or ARR2B 8040 to state CPA 8050 if there is no additional multiplication to perform, or begins a second multiplication. If no additional multiplication is needed, the multiplier is run through CPA 8050 and then either returns to IDLE 8010 or begins a new multiplication as discussed above.

If a second multiplication is ready to be performed when the first multiplication is ready to be run through the CPA, then the multiplier either transitions to CPA1 8060 (for a 32×16 multiplication) or CPA2A 8070 (for a 32×32 multiplication). In state CPA1 8060, the first multiplication is run through the CPA and the second multiplication is run through the array unit. The multiplier then transitions to state CPA 8050 to finalize the second multiplication.

If the second multiplication is a 32-bit multiplication, then in state CPA2A 8070 the first multiplication is run through the CPA and the second multiplication is run through the array unit. The multiplier then transitions to state ARR2B 8040 to complete the 32×32 multiplication. This pipelined approach allows 32×16 multiplications to be issued every clock cycle, with a two-cycle latency. Also, 32×32 multiplications may be issued every other clock cycle, with a three-cycle latency.

Figure 9:
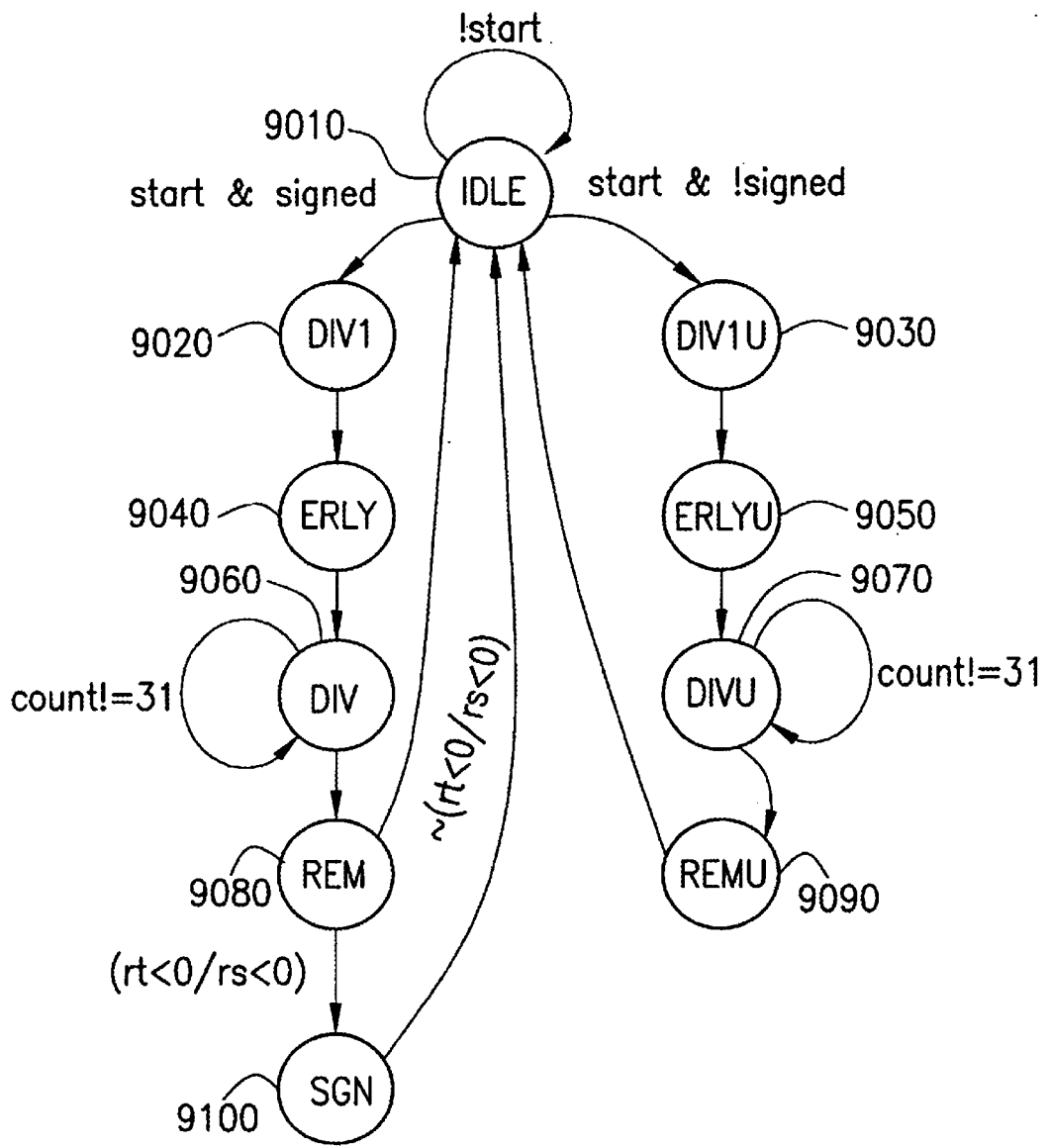
FIG. 9 is a finite state machine implementing steps for performing division instructions.

Referring to FIG. 9, iterative division operations may be implemented using a finite state machine. In one implementation, the MDU begins in IDLE state 9010. When a signal is received to begin a division operation, the MDU either transitions to DIV1 9020 if the operation is signed or DIV1U 9030 if the operation is unsigned. States DIV1 9020 and ERLY 9040 are used to prepare signed operands for division, and adjust the signs as necessary. States DIV1U 9030 and ERLYU 9050 are used to prepare an unsigned division operation. In states ERLY 9040 and ERLYU 9050, leading zeros are detected in operand RS to adjust the number of division iterations necessary.

Iterative division is performed in states DIV 9060 and DIVU 9070. Division may be performed by using a series of iterative add/subtracts and shifts. Finally, the remainders are finalized in states REM 9080 and REMU 9090. If either of the operands is negative, sign adjustment is performed in state SGN 9100.

Referring again to FIG. 4, in one implementation, permutation logic 4300 is used to support the PPERM instruction described above. Permutation logic 4300 consists of 6 single bit 32:1 selectors that may be used to select any of the 32 bits of RShold 3010 based on the value of RThold 3012. This logic may be implemented directly in the data path module.

For example, permutation logic 4300 may be used to execute the instruction "PPERM $5, $6". Permutation logic 4300 uses 6 5-bit selectors determined by RThold 3012 to identify which bits to include as output from RShold 3010. For example, if register $5 contains the low-order bits "010101", then the selector "00010" (corresponding to the low-order bits of register $6) would choose bit 2 (i.e., the third bit from the right) containing "1". If RThold 3012 contains the low-order bits "0001000011" (corresponding to the 10 low-order bits of register $6), then bit 2 (containing a "1") and bit 3 (containing a "0") will be selected to yield "10". Using this method, permutation logic 4300 may select bits from RShold 3010 to generate 6 bits based on RThold 3012. The resulting 6 bits are concatenated to the 66 low-order bits of ACC1 to form the result. This effectively shifts the 66 low-order bits of ACC1 six bits to the left and replaces the 6 low-order bits with the output of the permutation logic 4300.

The PPERM instruction discussed above is one technique that may be used to provide bitwise permutation support in hardware. In a strict mathematical sense, a bitwise permutation consists of an arbitrary re-ordering of an ordered group of bits within a register or a memory location, as a one-to-one mapping. Permutations as described herein may be more general operations in which one-to-many and one-to-none mappings are also possible. If enough hardware is used, any permutation may be performed in a single clock cycle. However, for anything other than a fixed permutation, a significant amount of state must be established before the permutation may be performed. For example, if bits from a 32-bit value are permuted into an expanded 48-bit value, each of the 48 destination bits requires 5 bits of data to indicate the corresponding source bit. Thus, 240 bits of state are needed to fully specify the operation. The amount of state required to specify a permutation may be reduced by reducing the number of destination bits that may be permuted. These partial permutation operations permit extensive permutations to be completed over multiple clock cycles while providing increased performance relative to shift-and-mask algorithms that may be used with unaugmented instruction sets. Partial permutation instructions may be provided that take inputs such as the following: (1) a subset of destination bits to permute into; (2) a description of the source of each bit in the subset of destination bits to permute into; (3) a previous partial value; and (4) a destination register.

Destination bits may be specified in several ways, with varying degrees of economy. For example, destination bits may be specified in a free-form format with each destination bit using at least a 5-bit value to specify its position. Destination bits also may be specified as a contiguous group starting at an explicitly controlled bit, requiring at least 5 bits per instruction. Additionally, destination bits may be specified as a contiguous group starting at an implicitly controlled bit, with a full permutation operation being performed as a canonical instruction sequence.

The PPERM instruction provides a hardware implementation of partial bitwise permutations in a microprocessor multiply or multiply/divide unit. In addition to the PPERM instruction discussed above, several alternative implementations of partial bitwise permutations may be desirable.

Referring to FIG. 10A, a partial permutation operation taking four operands may be specified. The rd operand specifies the destination register to store the result. The rs operand specifies the input word used as the source bits for performing a partial permutation. The rt operand identifies a register storing a previous partial value. Finally, the ru operand is used as a control input to specify the partial permutation that is to be performed.

Referring to FIG. 10B, the control register specified by operand ru may be implemented using four 5-bit values to specify the source bits, a mask specifying which of the four destination bits to permute, a default bit, and a destination nibble. The destination nibble may be used to specify a particular 4-bit field within the destination register to place the resulting permuted bits. For example, if the destination nibble is 0, the low-order four bits of the destination register are replaced.

The four source bit identifiers specify which bits of the input word (specified by rs) are used to replace the corresponding bits in the destination register (specified by rd). These source bit identifiers form a 4-bit field to be placed as specified by the destination nibble. For example, if source bit 0 is "00010", then bit 2 of rs is the low order bit of the 4-bit field. If rs contains "1010", then a "0" (bit 2 is the third bit from the right) forms the low-order bit of the destination nibble.

The mask is used to specify whether to permute the corresponding source bit. For example, a mask of "00111" will only perform the permutations specified by source bits 0, 1, and 2. If the corresponding mask bit is 0, the default bit is used in the destination nibble. In this example, the mask bit corresponding to source bit 3 is a "0", therefore the value of the default bit is used for the high-order bit of the destination nibble. The use of masks and default bits, wherein the default bit may be zero, one, or an indication that the value of destination bits unselected for permutation by the mask is to remain unchanged, is useful where the desired result value is the permutation of bits gathered from multiple source words. The value of all nibbles of the destination register not selected for the operation are copied from the previous partial value specified by operand rt.

Referring to FIG. 11A, in another implementation of partial permutations, fewer registers are used in specifying partial permutation instructions. In this implementation, a destination operand rd and a source operand rs are specified. Instead of using a control register, as discussed above, two source bit specifiers are included in the instruction. Using this instruction format, instructions specify fewer bits to permute. However, the instruction repeat rate may be higher.

Because there is a mask or starting specifier used in this instruction format, the source register of the previous partial permutation is implicitly the destination register and the instruction implicitly performs a shift or rotate by two bits on the previous value before merging in the two additional bits from the source. The absence of a mask for bits whose values are not derivable from the current source (rs) register may be handled by using explicit shift/rotate instructions, and by using a single-bit partial permutation instruction.

Referring to FIG. 11B, a single-bit partial permutation instruction includes an analogous format to the two-bit format discussed with reference to FIG. 11A. In this implementation, a single bit is specified in the instruction field and an implicit one-bit shift is performed before replacing the low-order bit with the selected source bit.

Referring to FIG. 12A, partial permutations also may be performed using the accumulator of a multiply/divide unit. For example, the instruction format shown in FIG. 12A includes a source register operand rs, a control word operand rt, and a destination quibble (5-bit field identifier). The HI/LO registers of MDU 2030 may be used implicitly as the source data register and the previous partial value source.

Referring to FIG. 12B, a control word may contain a default bit, a mask, and source bits as described above with reference to FIG. 10B. However, in this implementation, the destination quibble (as opposed to nibble) is specified in the instruction, leaving space for an additional source bit identifier in the control word. Instructions in this format operate on the HI/LO register pair and may be used to make expansion permutations more efficient (e.g., 32-bit values expanded to 48-bit values).

Referring to FIG. 13A, partial permutations also may be performed using the accumulator of a multiplier or multiply/divide unit and no mask. For example, the instruction format shown in FIG. 13A includes a source register operand rs and a control word operand rt. The HI/LO registers of MDU 2030 may be used implicitly as the previous partial value source. Referring to FIG. 13B, a control word may contain a description of six source bits as described above with reference to FIG. 10B.

Additional partial permutation implementations may increase the number of bits specified by using more than one control word operand. For example, one implementation uses an instruction encoding such as that described in FIG. 10A and a control word encoding such as that described in FIG. 10B, except that two control words may be specified.

This implementation uses operand rt to specify a second control word operand instead of the previous partial value source, which is implicitly specified as another register, for example, the HI/LO register. Additional implementations allow (i) permutation of 12 bits by modifying the instruction coding of FIG. 13A to provide two control word operands, such as that described in FIG. 13B; and (ii) permutations of 10 bits using two control word operands as described with reference to FIG. 12B.

In addition to multiplier implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. In an instruction set architecture, an instruction for performing partial bitwise permutations, the instruction being part of the instruction set architecture and including:
   an opcode identifying the instruction as a partial permutation instruction; and
   a permutation operation specification including:
      a partial value source specifier;
      a destination subset specifier identifying one or more destination bits of a destination register, wherein the destination register comprises a multiply unit accumulator; and
      a control specifier identifying a source for each of the one or more destination bits identified by the destination subset specifier;
   wherein the instruction is processed by performing a partial bitwise permutation defined by the permutation operation specification.

2. The instruction of claim 1 wherein the partial value source specifier specifies a multiply unit accumulator.

3. The instruction of claim 1 wherein the partial value source specifier specifies a general-purpose register.

4. The instruction of claim 1 wherein the destination subset specifier identifies a contiguous block of bits within the destination register.

5. The instruction of claim 4 wherein the contiguous block of bits includes the least significant bit of the destination register.

6. The instruction of claim 5 wherein the contiguous block of bits includes 12 or fewer bits.

7. The instruction of claim 1 wherein the control subset specifier includes one or more source bit identifiers.

8. The instruction of claim 7 where the control subset specifier further includes:
   a mask selecting bits to receive permutation data; and
   a default bit identifying a default value to be assigned to bits not selected by the mask to receive permutation data.

9. The instruction of claim 7 wherein each of the one or more source bit identifiers is a field within the instruction.

10. The instruction of claim 7 wherein each of the one or more source bit identifiers are stored in a control register, the control register identified by the control specifier.

11. The instruction of claim 1 wherein the instruction set comprises a RISC instruction set.

12. A method for performing partial bitwise permutations using an instruction, the instruction including:
   fetching an instruction to perform an operation from a data store;
   reading one or more registers;
   performing the operation specified by the instruction, the instruction including:
      an opcode identifying the instruction as a partial permutation instruction; and
      a permutation operation specification including:
         a partial value source specifier;
         a destination subset specifier identifying one or more destination bits of a destination register, wherein the destination register comprises a multiply unit accumulator; and
         a control specifier identifying a source for each of the one or more destination bits identified by the destination subset specifier;
   wherein the instruction is processed by performing a partial bitwise permutation defined by the permutation operation specification.

13. The method of claim 12 wherein the partial value source specifier specifies a multiply unit accumulator.

14. The method of claim 12 wherein the partial value source specifier specifies a general-purpose register.

15. The method of claim 12 wherein the destination subset specifier identifies a contiguous block of bits within the destination register.

16. The method of claim 15 wherein the contiguous block of bits includes the least significant bit of the destination register.

17. The method of claim 16 wherein the contiguous block of bits includes 12 or fewer bits.

18. The method of claim 12 wherein the control subset specifier includes one or more source bit identifiers.

19. The method of claim 18 where the control subset specifier further includes:
   a mask selecting bits to receive permutation data; and
   a default bit identifying a default value to be assigned to bits not selected by the mask to receive permutation data.

20. The method of claim 18 wherein each of the one or more source bit identifiers is a field within the instruction.

21. The method of claim 18 wherein each of the one or more source bit identifiers are stored in a control register, the control register identified by the control specifier.

22. The method of claim 12 wherein the instruction is part of an instruction set, and the instruction set comprises a RISC instruction set.

23. A computer-readable medium comprising a microprocessor core embodied in software, the microprocessor core including an instruction for performing partial bitwise permutations, the instruction including:
- an opcode identifying the instruction as a partial permutation instruction; and
- a permutation operation specification including:
  - a partial value source specifier;
  - a destination subset specifier identifying one or more destination bits of a destination register, wherein the destination register comprises a multiply unit accumulator; and
  - a control specifier identifying a source for each of the one or more destination bits identified by the destination subset specifier;
- wherein the instruction is processed by performing a partial bitwise permutation defined by the permutation operation specification.

24. The computer-readable medium of claim 23 wherein the partial value source specifier specifies a multiply unit accumulator.

25. The computer-readable medium of claim 23 wherein the partial value source specifier specifies a general-purpose register.

26. The computer-readable medium of claim 23 wherein the destination subset specifier identifies a contiguous block of bits within the destination register.

27. The computer-readable medium of claim 26 wherein the contiguous block of bits includes the least significant bit of the destination register.

28. The computer-readable medium of claim 27 wherein the contiguous block of bits includes 12 or fewer bits.

29. The computer-readable medium of claim 23 wherein the control subset specifier includes one or more source bit identifiers.

30. The computer-readable medium of claim 29 where the control subset specifier further includes:
- a mask selecting bits to receive permutation data; and
- a default bit identifying a default value to be assigned to bits not selected by the mask to receive permutation data.

31. The computer-readable medium of claim 29 wherein each of the one or more source bit identifiers is a field within the instruction.

32. The computer-readable medium of claim 29 wherein each of the one or more source bit identifiers are stored in a control register, the control register identified by the control specifier.

33. The computer-readable medium of claim 23 wherein the instruction is part of an instruction set, and the instruction set comprises a RISC instruction set.

34. In a microprocessor containing a first general purpose register, a second general purpose register and an extended-precision accumulator, a method for performing a partial permutation comprising:
- shifting contents of the extended-precision accumulator to produce a predetermined number of open bit positions;
- selecting bits for filling the open bit positions with information contained in the first general purpose register; and
- filling the open bit positions with bits retrieved from the second general purpose register, wherein the shifting, selecting and filling occur in response to a single instruction.

35. The method of claim 34 wherein the single instruction specifies the first and second general purpose registers.

36. The method of claim 34 wherein the predetermined number of open bit positions are six least significant bits of the extended-precision accumulator.

* * * * *

UNITED STATES PATENT AND TRADEMARK OFFICE
CERTIFICATE OF CORRECTION

PATENT NO. : 7,237,097 B2
APPLICATION NO. : 09/788683
DATED : June 26, 2007
INVENTOR(S) : Kissell et al.

It is certified that error appears in the above-identified patent and that said Letters Patent is hereby corrected as shown below:

Title Page
Item (56), under References Cited, U.S. PATENT DOCUMENTS, add the following:

5,850,452 A   12/1998   Sourgen et al.
4,023,023 A   05/1977   Bourrez *et al.*
5,181,183 A   01/1993   Miyazaki
5,761,523 A   06/1998   Wilkinson *et al.*
6,041,403 A   03/2000   Parker *et al.*
6,141,786 A   10/2000   Cox *et al.*
6,199,088 B1  03/2001   Weng *et al.*
6,279,023 B1  08/2001   Weng *et al.*
6,295,599 B1  09/2001   Hansen *et al.*

Item (56), under References Cited, OTHER PUBLICATIONS, add the following:

Koç, Ç,.K., and Acar, T., "Montgomery Multiplication in GF ($2^k$)," *Proceedings of Third Annual Workshop on Selected Areas in Cryptography*, pp. 95-106, Queens University, Kingston, Ontario, Canada, August 15-16, 1996 (13 pages).
IBM Technical Disclosure Bulletin, "Pipelined Hardware Multiplier with Extended Precision," Vol. 23, Issue 9, pp. 4322-4323 (February 1, 1981) (5 pages).
*A236 Parallel Digital Signal Processor Chip Programmer's Reference Manual*, Oxford Micro Devices, Inc., 1994, 195 pages (Bates Numbers L11184-L11378).
*DSP56000 24-Bit Digital Signal Processor Family Manual*, Motorola, Inc., 1995, 638 pages (Bates Numbers L08722-L09359).
Lijun Gao, Sarvesh Shrivastava, Hanbo Lee, Gerald E. Sobelman, "A Compact Fast Variable Key Size Elliptic Curve Cryptosystem Coprocessor," *Proceedings of the $7^{th}$ Annual IEEE Symposium on Field-Programmable Custom Computing Machines*, April 21-23, 1999, pp. 304-305 (4 pages).
*$i860^{TM}$ Microprocessor Family Programmer's Reference Manual*, Intel Corporation, 1992, 79 pages (Bates Numbers L09361-L09439).
*IEEE Standard for Binary Floating-Point Arithmetic*, IEEE, 1985, pages i-vi and 1-14.
Koc, C.K., and Acar, T., "Fast Software Exponentiation in GF($2^k$)," *Proceedings of the $13^{th}$ IEEE Symposium on Computer Arithmetic*, IEEE, July 6-9, 1997, pp. 225-231 (9 pages).
*TMS320C1x/C2x/C2xx/C5x Assembly Language Tools User's Guide*, Texas Instruments, March 1995, 483 pages (Bates Numbers L07916-L08398).
*TMS320C5x General-Purpose Applications User's Guide*, Texas Instruments, July 1997, 167 pages (Bates Numbers L08399-L08565).
*$VIS^{TM}$ Instruction Set User's Manual*, Sun Microsystems, Inc., 1997, pages i-xii and 1-136.

UNITED STATES PATENT AND TRADEMARK OFFICE
CERTIFICATE OF CORRECTION

PATENT NO. : 7,237,097 B2
APPLICATION NO. : 09/788683
DATED : June 26, 2007
INVENTOR(S) : Kissell et al.

It is certified that error appears in the above-identified patent and that said Letters Patent is hereby corrected as shown below:

Column 14
Line 3, replace "control subset" with --control--.
Line 5, replace "control subset" with --control--.
Line 5, replace "where" with --wherein--.
Line 19, replace "instruction including:" with --method comprising:--.
Line 52, replace "control subset" with --control--.
Line 54, replace "control subset" with --control--.
Line 54, replace "where" with --wherein--.

Column 15
Line 35, replace "control subset" with --control--.

Column 16
Line 1, replace "where" with --wherein--.
Line 2, replace "control subset" with --control--.

Signed and Sealed this

Eleventh Day of December, 2007

JON W. DUDAS
*Director of the United States Patent and Trademark Office*